United States Patent
Merrien (10) Patent No.: US 7,222,783 B2
(45) Date of Patent: May 29, 2007

(54) SECURE TRANSFER OF DATA BETWEEN TWO SMART CARDS

(75) Inventor: Lionel Merrien, Montreal (CA)

(73) Assignee: Gemplus, Gemenos (FR)

( * ) Notice: Subject to any disclaimer, the term of this patent is extended or adjusted under 35 U.S.C. 154(b) by 248 days.

(21) Appl. No.: 11/086,279

(22) Filed: Mar. 23, 2005

(65) Prior Publication Data
US 2005/0279826 A1 Dec. 22, 2005

(30) Foreign Application Priority Data
May 13, 2004 (FR) ................................. 04 05172

(51) Int. Cl.
*G06K 5/00* (2006.01)

(52) U.S. Cl. ..................................................... 235/380

(58) Field of Classification Search ................. 235/380
See application file for complete search history.

(56) References Cited

U.S. PATENT DOCUMENTS 5,854,581 A * 12/1998 Mori et al. ................. 235/379

* cited by examiner

*Primary Examiner*—Michael G. Lee
*Assistant Examiner*—Tae W. Kim
(74) *Attorney, Agent, or Firm*—Buchanan, Ingersoll & Rooney PC (57) ABSTRACT

A device external to a terminal transmits a specific application identifier and an encrypted first key and number to a first chip card in service in the terminal. In the first card, if the decrypted first number satisfies a first condition, the specific application is called up, application data are read, the data are encrypted using the decrypted first key to transmit them to the external device, and the application is made inoperable. Following replacement of the first card by a second card, the external device transmits the identifier and an encrypted second key and number to the second card. In the latter, if the decrypted second number satisfies a second condition, the encrypted data are transmitted to the second card so that the latter calls up the application, decrypts the encrypted data using the decrypted second key and installs said data.

11 Claims, 6 Drawing Sheets

SECURE TRANSFER OF DATA BETWEEN TWO SMART CARDS

BACKGROUND OF THE INVENTION

The present invention relates to the secure transfer of data from a first data processing means which is connected to the terminal means to a second data processing means which is to be connected to the terminal means. More particularly, it relates to such a transfer of data when the first and second data processing means are chip cards, the first of which contains confidential data relating to a user of the card, which data are to be transferred to the second card intended to replace the first.

For example, the chip cards are SIM or USIM (Subscriber Identity Module) cards and the terminal means is a terminal of a mobile user.

At present, if a first SIM card in service in the terminal of the mobile user has to be replaced on account of a malfunction of the card or due to an improvement to the SIM cards by the operator responsible therefore, the user must go to a point of sale of the operator in order to transfer confidential data from the first and old card to a second and new card via a special data transfer machine and to delete the confidential data in the first card or destroy the latter.

The transfer machine may be a copying device according to patent application WO 03/085631.

SUMMARY OF THE INVENTION

The object of the present invention is to transfer confidential data from a first card to a second card without requiring any displacement of the user and by using secure communications via the terminal connected to the first card and the telecommunication network serving the terminal, while preventing use of the first card following transfer of the data.

In order to achieve this object, a method for transferring data from a first data processing means which is connected to the terminal means to a second data processing means which is to be connected to the terminal means is characterized in that it comprises the following steps:

transmitting a specific application identifier from an external means to the first processing means via the terminal means, in the first processing means, calling up the specific application designated by the transmitted identifier, reading data relating to the specific application, encrypting the data so as to transmit encrypted data to the external means, and making inoperable the specific application before or after the encryption step, replacing the first processing means with the second processing means, transmitting the specific application identifier from the external means to the second processing means via the terminal means, and transmitting the encrypted data from the external means to the second processing means so that the latter calls up the specific application designated by the transmitted identifier, decrypts the encrypted data and installs the decrypted data.

According to one preferred embodiment of the invention, the data may be made secure as follows. An encrypted first key and number are transmitted with the specific application identifier from the external means to the first processing means via the terminal means, the first processing means decrypts the encrypted first key and number and, if the decrypted first number satisfies a first condition, calls up the specific application designated by the transmitted identifier and encrypts the read data relating to the specific application by using the first key, an encrypted second key and number are transmitted with the specific application identifier from the external means to the second processing means via the terminal means, the encrypted second key and number are decrypted in the second processing means and, if the decrypted second number satisfies a second condition, the external means transmits the encrypted data to the second processing means and decrypts the encrypted data by using the first key prior to installing them.

By virtue of the encryption of the first key and number and of the second key and number in the external means and the encryption of the data in the first processing means, the transfer of data from the first processing means via the external means to the second processing means is secure. The first and second keys may be different for asymmetrical data encryption and decryption algorithms, or may be identical for symmetrical data encryption and decryption algorithms.

The inoperable nature of the specific application, relating to the replacement for example of the chip card as a data processing means, may bring about a deletion of the decrypted first key and number in the first processing means once the encrypted data have been transmitted to the external means, and this makes it impossible for the first processing means to be used by any criminal person in particular instead of the authorized user. A deletion of the decrypted second key and number in the second processing means once the encrypted data have been decrypted keeps secret from any criminal person the means for generating the second key and number.

For the same reason, if the decrypted first number does not satisfy the first condition compared to a number read in the first processing means, a deletion of the encrypted first key and number in the first data processing means and/or a signalling of the stoppage of the transfer process from the first data processing means to the external means make the first processing means unusable. If the decrypted second number does not satisfy the second condition compared to a number read in the second processing means, a deletion of the encrypted second key and number in the second data processing means and/or a signalling of the stoppage of the transfer process from the second data processing means to the external means make the second processing means unusable.

According to a first embodiment of the invention, the first and second numbers are random numbers produced by the first and second processing means and retrieved in the external means prior to the transmission of the specific application identifier and of the encrypted first key and number to the first processing means, the first condition is an equality of the decrypted first number and of a number read in the first processing means, and the second condition is an equality of the decrypted second number and of a number read in the second processing means.

According to a second embodiment of the invention, the first and second numbers are transfer counts incremented by respective increments in the external means each time the latter is made to designate a specific application, such as that designated by said identifier, and to call it up in the first processing means and then in the second processing means. The first condition is a superiority of the decrypted first number over a number read in the first processing means which, if it is satisfied, brings about the replacement of the number read in the first processing means by the decrypted first number. The second condition is a superiority of the decrypted second number over a number read in the second processing means which, if it is satisfied, brings about the replacement of the number read in the second processing means by the decrypted second number.

In order to further reinforce the data transmission security, a hashing of said data may be provided. In this case, according to one preferred embodiment of the invention, the external means creates and encrypts beforehand a first electronic coupon including the first key, the first number and also a hashing key and a second electronic coupon including the second key and the second number and also the hashing key, and transmits the specific application identifier and the first coupon to the first processing means via the terminal means. The first processing means decrypts the first coupon and transmits to the external means the encrypted data in the form of blocks of predetermined maximum length and a fingerprint which results from a hashing applied to the encrypted data and depends on the hashing key collected from the decrypted first coupon. The external means transmits the specific application identifier and the second coupon to the second processing means via the terminal means. The second processing means decrypts the encrypted second coupon. If the second number retrieved from the decrypted second coupon and a number read in the second processing means satisfy the second condition, the encrypted data in the form of blocks are transmitted from the external means to the second processing means so that the latter, for each received block, determines a fingerprint which it compares with the fingerprint extracted from the received block and decrypts the data in the blocks only if the fingerprints compared for each block are identical.

BRIEF DESCRIPTION OF THE DRAWINGS

Other features and advantages of the present invention will emerge more clearly from reading the following description of a number of preferred embodiments of the invention which are given by way of non-limiting examples and with reference to the corresponding appended drawings, in which.

DETAILED DESCRIPTION

Figure 1:
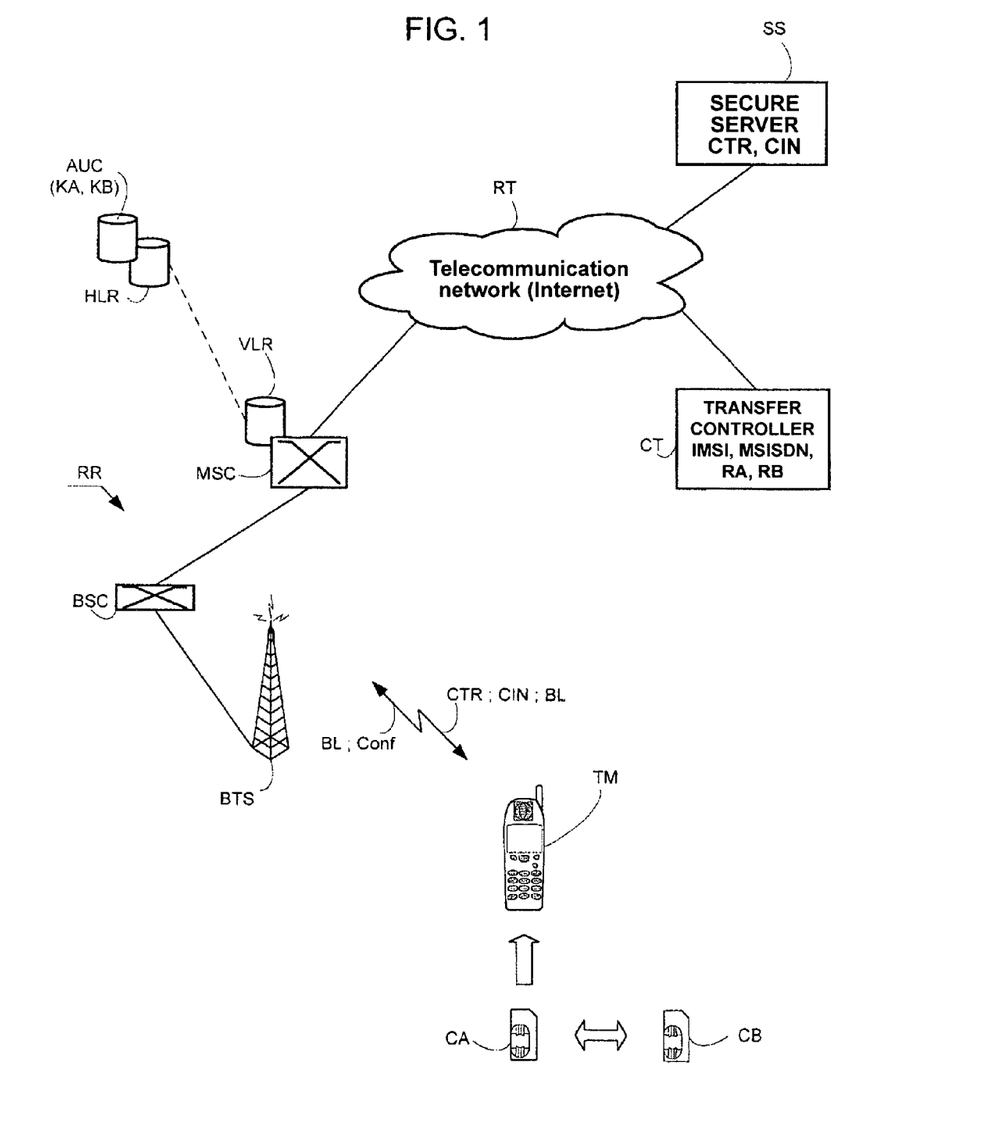
FIG. 1 is a schematic block diagram of a system for transferring data between two SIM cards by means of a secure server and a transfer controller.

According to the embodiment shown in FIG. 1, the two data processing means between which data are to be transferred are chip cards CA and CB, also known as microcontroller cards of the removable module type, referred to as SIM (Subscriber Identity Module) or USIM cards, and the terminal means which receives the data processing means one after the other is a mobile user's radiocommunication terminal TM. The mobile terminal TM is connected to the fixed network of a digital cellular radiocommunication network RR for example of the GSM or UMTS type.

Figure 2:
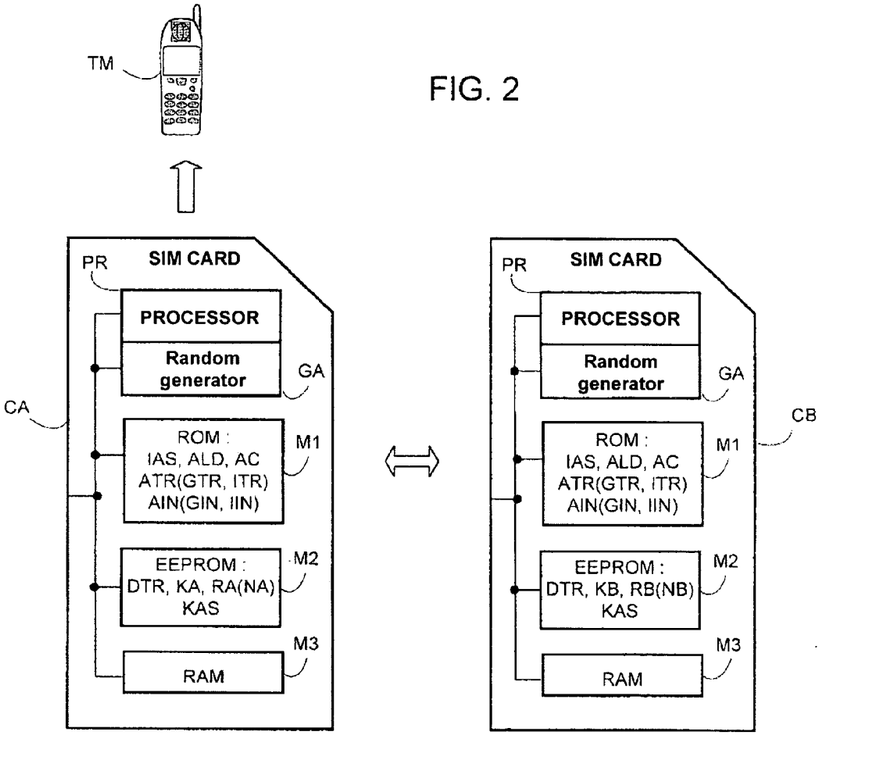
FIG. 2 is a schematic block diagram of two SIM cards, one of which is to replace the other.

Each SIM microcontroller card CA, CB comprises, as shown in detail in the card CA in FIG. 2, essentially a microprocessor PR and three memories M1, M2 and M3. The memory M1 is of the ROM type and includes an operating system for the card and often a virtual machine of the JavaCard type on which the operating system is supported. Besides algorithms for authentication, communication and specific applications AS, the memory M1 contains a data transfer application ATR and a data installation application AIN which are specific to the invention. As will be seen below, the transfer application ATR comprises a transfer manager GTR and at least one transfer interface ITR relating to a specific application IAS useful for the invention, and serves to extract data to be transferred DTR relating to at least the specific application IAS by reading them in the card CA and transferring them to an external entity known as the transfer controller CT. The installation application AIN comprises an installation manager GIN and at least one installation interface IIN relating to the specific application IAS, and serves to transfer the data DTR from the transfer controller CT to the second chip card CB. It will be assumed that the specific application IAS relates to a SIM card replacement. In order to run the applications ATR and AIN, the invention adds, to the set of preformatted commands according to the protocol format for communication between a SIM card and a mobile terminal TM, two specific transfer and installation commands in the form of application protocol data units APDU for example according to the standard ISO 7816-4. Each command is thus compatible with the asynchronous communication protocol between the terminal TM and the chip card CA so as to transmit data from the transfer controller, for example in the form of a command of the "ENVELOPE" type, without the terminal TM interpreting them, and to the virtual machine included in the chip card so that it interprets them.

The memory M2 is a non-volatile memory of the EEPROM type which includes in particular the specific data to be transferred DTR which relate to specific applications and may be keys and security codes and/or may comprise data personal to the user who owns the card CA, CB, such as a subscription profile of the user, a list of telephone numbers, a list of e-mail addresses, a confidential code, etc. The memory M2 also serves to record at least temporarily parameters transmitted by the transfer controller CT. The memory M2 in the card CA, CB also contains a secret encryption key KA, KB which serves to decrypt a transfer coupon message CTR transmitted by the transfer controller CT.

The memory M3 is conventionally a RAM memory which serves to process the data to be exchanged between the processor PR and the microcontroller included in the mobile terminal TM.

The SIM card CA, CB also contains, at least in a first embodiment, a random number generator GA which is implemented in hardware terms in or in connection with the processor PR of the chip card. The generator GA in the card CA, CB generates a random number RA, RB which serves to authenticate the controller CT. As a variant, the random number generator is included in the form of software in the ROM memory M1.

The data transfer system which implements the invention comprises a means external to the terminal TM containing the SIM card CA to be replaced: a secure server SS and the transfer controller CT. These two external entities CT and SS are accessible to the mobile terminal TM via at least part of the fixed network of the cellular radiocommunication network RR and via a telecommunication network RT. The telecommunication network RT groups together a set of means and telecommunication networks for connecting the mobile terminal TM to the transfer controller CT. The radiocommunication network RR is shown schematically in FIG. 1 by a base station BTS, a base station controller BSC and a mobile switching centre MSC in the zone where the mobile terminal TM is temporarily located. If the data to be transferred DTR are managed by the operator in charge of the radiocommunication network RR, the transfer controller CT and the secure server SS are preferably considered to be internal to the network RR; for example, the transfer controller and the secure server are entities of the fixed part of the network RR which are connected to or integrated in a home location register HLR connected to a number of mobile switching centre MSC/visitor location register VLR pairs via the signalling network internal to the radiocommunication network RR.

According to another embodiment, in particular when the SIM card belongs for example to the issuer of the chip cards CA, CB or else to an issuer who issues specific applications in chip cards, the telecommunication network RT connecting the mobile terminal TM to the transfer controller CT conventionally comprises a high-speed packet network, such as the Internet network, and a switched telephone network or a packet switching network with mobility management and radio access of the GPRS type, or only the packet network.

The transfer controller CT thus constitutes an OTA (Over The Air) platform which extracts specific data DTR via the radio link between the mobile terminal TM and the fixed network BTS, BSC, MSC of the radiocommunication network RR without the user of the card CA going to a point of sale or to a specific reader for extracting data. The transfer controller contains an application specific to the invention which may be divided into three parts designed to prepare a transfer of data in response to a transfer request from the chip card CA initially contained in the mobile terminal, to extract and transfer the specific data DTR, and to install the transferred data DTR in a second and new chip card CB. For example, the messages exchanged between the transfer controller and a chip card CA, CB are short messages.

The secure server SS communicates with the transfer controller CT via a signalling network or a packet network such as the Internet, or according to another variant is incorporated in a server which also includes the transfer controller CT. The main role of the secure server SS is to create a transfer coupon CTR and an installation coupon CIN and to encrypt data as a function of the respective encryption keys KA and KB which it has previously stored when the cards CA and CB were brought into service.

Figure 3A:
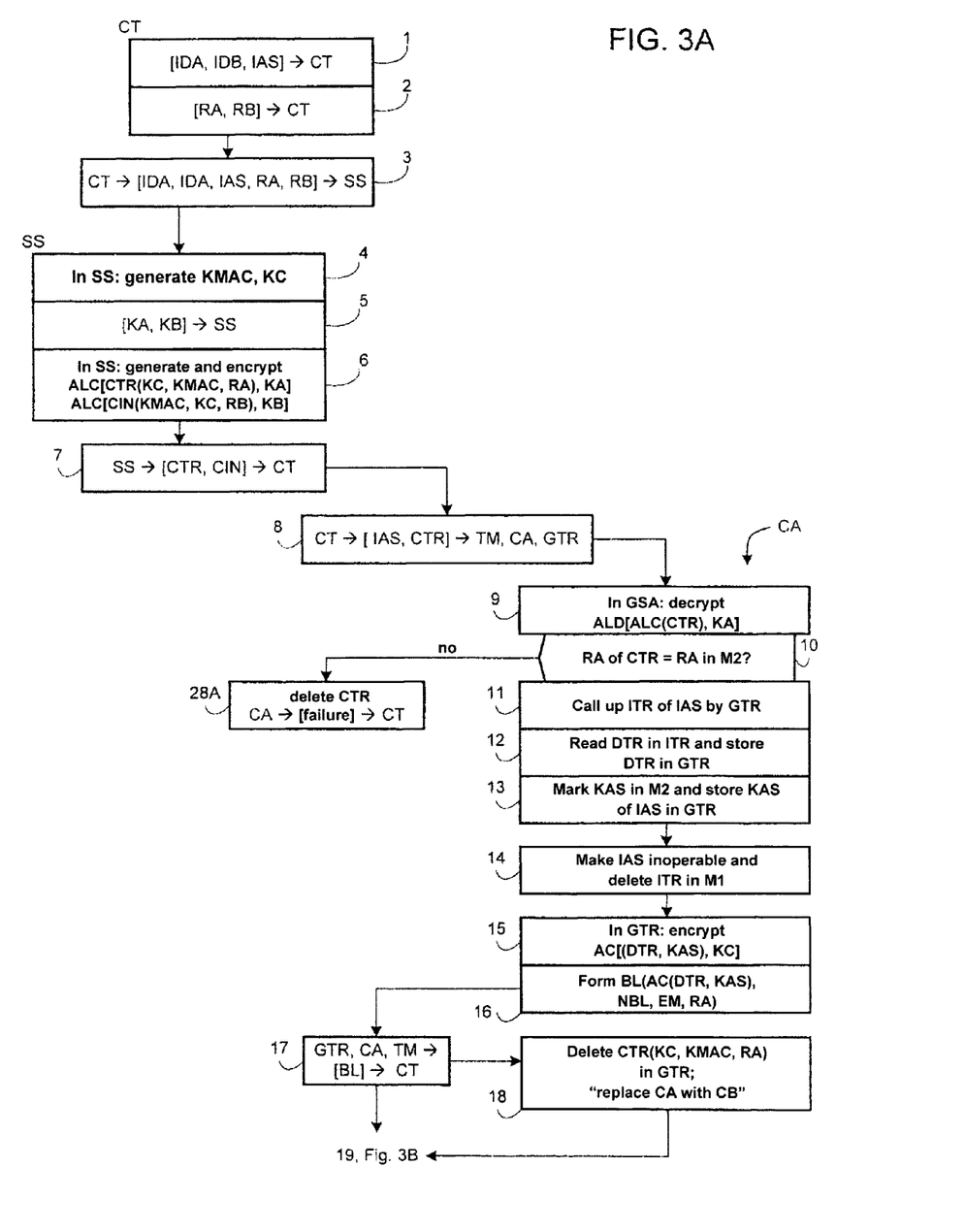
FIGS. 3A and 3B show steps of the data transfer method according to a first embodiment of the invention which calls for the generation of random numbers.
Figure 3B:
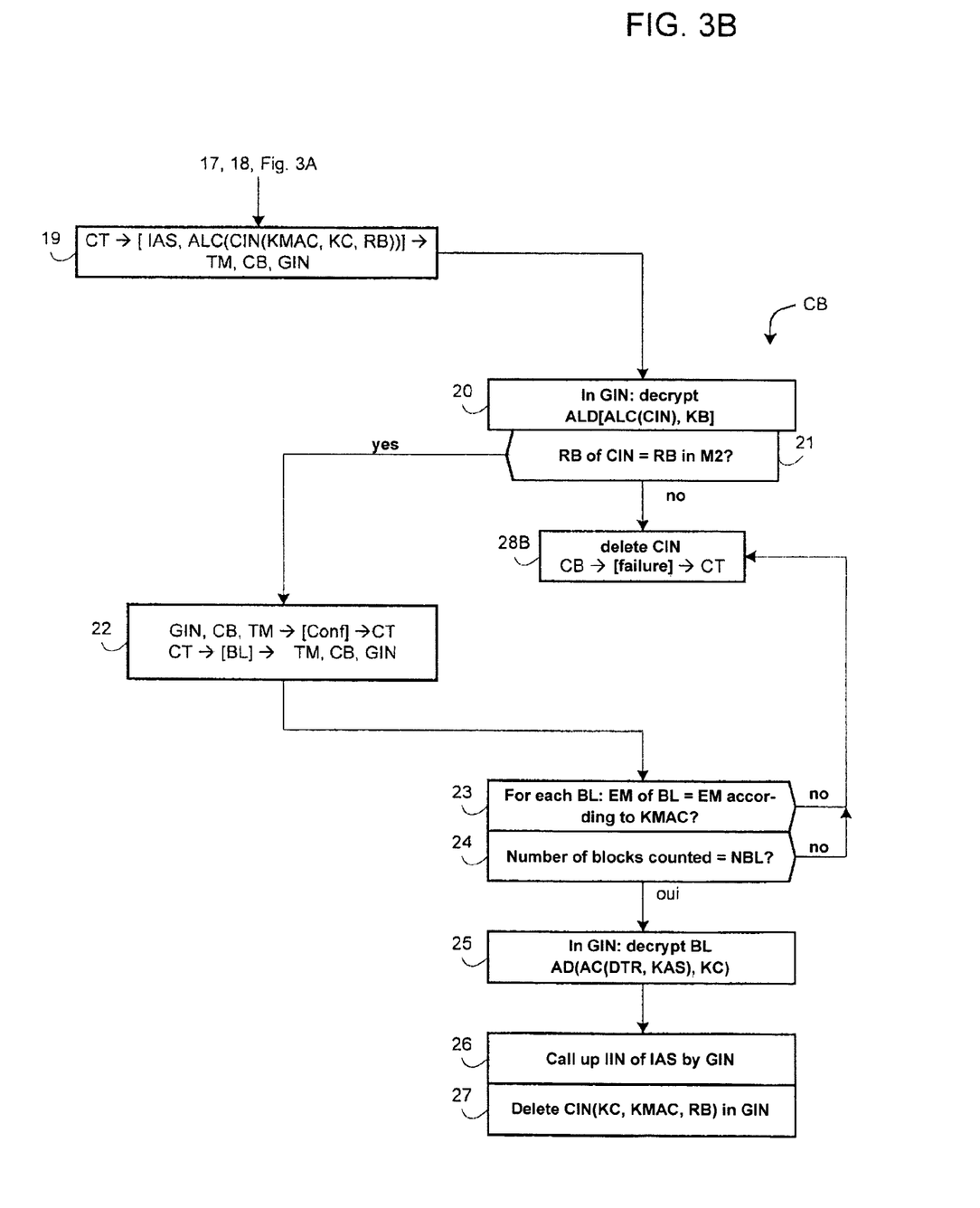

With reference now to FIGS. 3A and 3B, the method for transferring data from the chip card CA to the chip card CB mainly comprises steps 1 to 27 according to a first embodiment of the invention. This method is described within the context of a specific application relating to the renewal of the old SIM card CA by the new SIM card CB which the user has obtained from a point of sale of the operator of the radiocommunication network RR or else has received by mail.

Initially, in step 1, the transfer controller CT retrieves the identities IDA and IDB of the two cards CA and CB. For example, once the user of the card CA has obtained the new card CB, the operator registers that the card has been obtained in the home location register HLR and introduces thereto the identity IDB of the second card CB, and the register HLR automatically transmits the identities of the cards CA and CB to the transfer controller CT in the form of signed electronic certificates. The identity IDA, IDB of each card CA, CB in particular comprises a serial number of the card, the user's international identity IMSI (International Mobile Subscriber Identity) and the user's telephone number MSISDN (Mobile Station ISDN Number) and depends on the type of card. For example, the type of card relates to the type of processor PR, the number of bits per word processed by the processor, characteristics of the operating system or of the virtual machine, etc.

Then, in step 2, the transfer controller CT retrieves random numbers RA and RB produced by the random generators GA in the cards CA and CB. For example, the random numbers RA and RB are determined beforehand in a source other than the cards CA and CB, such as the home location register HLR, and stored in the cards when the latter are respectively brought into service, and are retrieved along with the identity of the cards from the register HLR by the controller CT in order to change cards.

The transfer controller CT starts the actual data transfer method by sending the retrieved card identities IDA and IDB and the retrieved random numbers RA and RB to the secure server SS and by specifying the specific application IAS targeted by the transfer method, in step 3. The specific application is in this case a SIM card replacement and is designated by an identifier IAS which is transmitted to the controller CT along with the card identities during step 1, or as a variant along with the random numbers RA and RB during step 2.

The secure server SS randomly generates, in step 4, in response to the message transmitted by the controller CT in the previous step 3, a transfer key KC and a hashing key KMAC for a message authentication code MAC which will be used in the card CA and then in the card CB.

Then, in the next step 5, the secure server SS retrieves transfer keys KA and KB pre-stored in the cards CA and CB. For example, the keys KA and KB are generated by an authentication centre AUC which cooperates with the home location register HLR of the network RR and is often on the same platform as the register HLR. The authentication centre authenticates the users of the network RR and assists in the confidentiality of the data passing via the radio interfaces between the mobile terminals and the base stations by managing key determination and authentication algorithms. As in the case of the retrieval of the card identities by the transfer controller CT in step 1, the secure server SS can retrieve the keys KA and KB when the card CB which is intended to replace the card CA is brought into service.

As a variant, the transfer keys KA and KB are provided by a database from which the secure server SS reads them in step 5.

In step 6, the secure server SS creates two electronic coupons CTR and CIN. The first coupon CTR is a data transfer coupon which includes the transfer key KC, the hashing key KMAC and the random number RA, and which is encrypted according to an encryption algorithm ALC as a function of the key KA. The second coupon CIN is a data installation coupon which includes the hashing key KMAC, the transfer key KC and the random number RB, and which is encrypted according to the encryption algorithm ALC as a function of the key KB. As a variant, the algorithm for encrypting the coupon CTR is different from the algorithm for encrypting the coupon CIN. According to yet another variant, the different encryption algorithms are respectively associated with the cards CA and CB and are transmitted in step 5 respectively along with the keys KA and KB to the secure server SS by the authentication centre AUC which generates them.

The secure server SS submits the two encrypted coupons CTR and CIN to the transfer controller CT by transmitting them thereto in step 7.

The method then passes to steps 8 to 16 for extracting data DTR of the specific application IAS in a secure manner from the card CA.

Following reception of the two encrypted coupons CTR and CIN, the transfer controller CT calls up the card CA and particularly the transfer manager GTR in said card by means of the retrieved card identity IDA, in step 8. During this call-up, the controller CT transmits the identifier IAS of the specific application and the encrypted transfer coupon CTR.

Using the key KA and a decryption algorithm ALD symmetrical to the encryption algorithm ALC used to encrypt the coupon CTR in step 6, the transfer manager GTR in the card CA decrypts the coupon CTR, in step 9.

The transfer manager GTR compares the random number RA retrieved in the decrypted coupon CTR with the initial random number RA read in the memory M2 in step 10. If the random numbers RA which are compared are different, the manager GTR deletes the decrypted coupon CTR, that is to say the keys KC and KMAC and the random number RA, from the card CA, and the transfer method is stopped at an end step 28A which consists in signalling the stoppage of the transfer method from the card CA to the transfer controller CT, and optionally in displaying a data transfer failure message in the mobile terminal TM in order to invite the user to change his card under the control of the operator at a point of sale.

If the compared random numbers RA are identical, the transfer manager GTR in the card CA calls up the transfer interface ITR of the specific application designated by the identifier IAS received by the card CA, in step 11. The transfer interface ITR returns the data DTR which are specific to said application and which are to be transferred, and the manager GTR stores them in step 12. If some keys KAS associated with the specific application AS have been stored outside the application IAS, in the EEPROM memory M2, the manager GTR points to the keys KAS in this memory and records them temporarily in a buffer memory along with the read data DTR, in step 13.

After having stored the data DTR and optionally the associated keys KAS, the transfer manager GTR makes the specific application IAS permanently inoperable by deleting it from the ROM memory M1, in step 14. If necessary, depending on the operating system in the memory M1 in the card CA, the transfer manager GTR completely deletes the application ITR from the memory M1 and the data DTR and the possible associated keys KAS from the memory M2, the data DTR and the keys KAS being in a buffer memory in the transfer manager. The operations in step 14 make the card CA unusable for a conventional use in a mobile terminal TM, and prevent any copying of the card CA along with the specific application IAS and the data DTR of the latter.

In step 15, the transfer manager GTR encrypts the data DTR and the possible associated keys KAS which are read in the buffer memory of the manager, according to an encryption algorithm AC and as a function of the transfer key KC. The encryption algorithm AC may be different from the encryption algorithm ALC in the transfer controller CT in order to improve security.

The data which have just been encrypted in step 15 are transmitted in successive blocks BL having a predetermined maximum length, expressed in terms of bits, to the transfer controller CT, in step 16. Each block BL contains, besides the data DTR to be transmitted and the encrypted associated keys KAS, the number NBL of blocks to be transmitted, the number of the block in the sequence of blocks to be transmitted, a condensed fingerprint EM which results from a one-way hashing applied to the encrypted data and the encrypted associated keys contained in the block and depending on the hashing key KMAC retrieved in the decrypted received coupon CTR, the random number RA and the key KMAC. The transfer manager GTR of the card CA successively transmits the blocks BL to the transfer controller CT, and the latter temporarily stores them in step 17.

The transfer manager GTR deletes the keys KC and KMAC and the random number RA and therefore the coupon CTR from the memory M2 of the card CA, in step 18.

As a variant, instead of being made inoperable prior to the encryption step 15, the specific application IAS is made inoperable after the encryption step 15 or after the forming step 16.

Also in step 18, the manager GTR invites the user to replace the card CA by the card CB in the mobile terminal TM, by displaying a text message or by broadcasting a voice message in the terminal. After steps 17 and 18, if the card CB has not signalled its presence in the mobile terminal TM to the network RR and to the transfer controller CT, the transfer controller CT periodically transmits a message until the card CB discharges it from doing so once the card CB has been inserted and has become active in the mobile terminal TM, in step 19. This message transmitted during the call-up of the card CB in step 19 contains the identifier IAS of the specific application AS, in the present case the replacement of a SIM card, and the encrypted installation coupon CIN which includes the keys KMAC and KC and the random number RB and which had been stored in step 6.

The transfer method continues with steps 20 to 27 relating to the installation of the data DTR in the second card CB, as shown in FIG. 3B.

In step 20, in the chip card CB, in response to the message transmitted by the controller CT via the network RR and the terminal TR, the installation manager GIN decrypts the encrypted coupon CIN using the decryption algorithm ALD and as a function of the key KB which was stored beforehand in the memory M2 when the card CB was brought into service.

The manager GIN compares the random number RB extracted from the decrypted received coupon CIN with the random number RB read in the memory M2 of the card CB, in step 21. In a step 28B, in a manner analogous to step 28A, if the compared random numbers RB are different, the installation manager GIN deletes the decrypted installation coupon CIN in the card CB, that is to say the keys KC and KMAC and the number RB in the card CB, and the transfer method is stopped by signalling the transfer failure by the installation manager GIN in the card CB to the transfer controller CT.

If the compared random numbers RB are identical, the installation manager GIN deletes the decrypted installation coupon CIN in the card CB, that is to say the keys KC and KMAC and the number RB in the card CB, and creates a confirmation command [Conf] which is relayed via the mobile terminal TM so as to transmit it to the transfer controller CT which, in response to this confirmation command, transmits the transferred data blocks BL to the card CB, in step 22.

For each received block BL, the installation manager GIN determines a condensed fingerprint EM according to the hashing algorithm already used in the card CA and as a function of the key KMAC contained in the decrypted coupon CIN, and compares the fingerprint determined with the fingerprint EM extracted from the received block BL, in step 23. If the compared fingerprints EM for one of the received blocks are different, the method stops by carrying out step 28B. The installation manager GIN verifies in step 24 that it has received all the blocks BL which had been transmitted by the card CA to the controller CT, by counting them and by comparing the block count with the total number NBL of blocks contained in each received block. If the number of blocks counted is incorrect, the method stops with step 28B.

As a variant, the order of steps 23 and 24 is inverted.

By contrast, if the fingerprints compared for each block are identical and the block count is correct, the installation manager GIN decrypts the encrypted specific application data DTR and possibly the encrypted keys KSA associated therewith in the concatenated blocks according to a decryption algorithm AD which is symmetrical to the encryption algorithm AC, using the key KC included in the coupon CIN, in step 25.

Then, in step 26, once all the received blocks BL have been decrypted, the manager GIN calls up the installation interface IIN relating to the specific application IAS so as to transfer thereto the decrypted data DTR and possibly the external keys KAS associated with the application.

Finally, in step 27, the installation manager GIN in the card CB deletes the keys KC and KMAC and the random number RB and therefore the coupon CIN in the memory M2 of the card CB. The chip card CB in the mobile terminal TM can then be used in the conventional manner by the user.

In the light of the description of the first embodiment above, the invention has the following advantages:

the confidential data to be transferred DTR come solely from the "source" card CA;

the confidential data are specific to an application IAS and independent of the steps in the transfer method;

the confidential data of a specific application IAS are all transferred together, not just some of them;

once extracted from the "source" card CA in secure form after steps 12 and 13, or 12 to 15 or 16, the confidential data DTR can definitively no longer be accessed or used in the "source" card CA; or else they are deleted, or else the specific application IAS which contains them is made inoperable definitively;

the confidential data DTR are installed just once in steps 23 to 26 in the "target" card CB;

the confidential data transfer method is independent of the encryption algorithms selected, which may be symmetrical or asymmetrical;

once the encrypted data have been transmitted from the "source" card CA to the external transfer controller CT in step 17, the encrypted data are lost following any interruption to the transfer method prior to installation of the encrypted data in the "target" card CB, and this is a guarantee against cloning of the data.

Figure 4A:
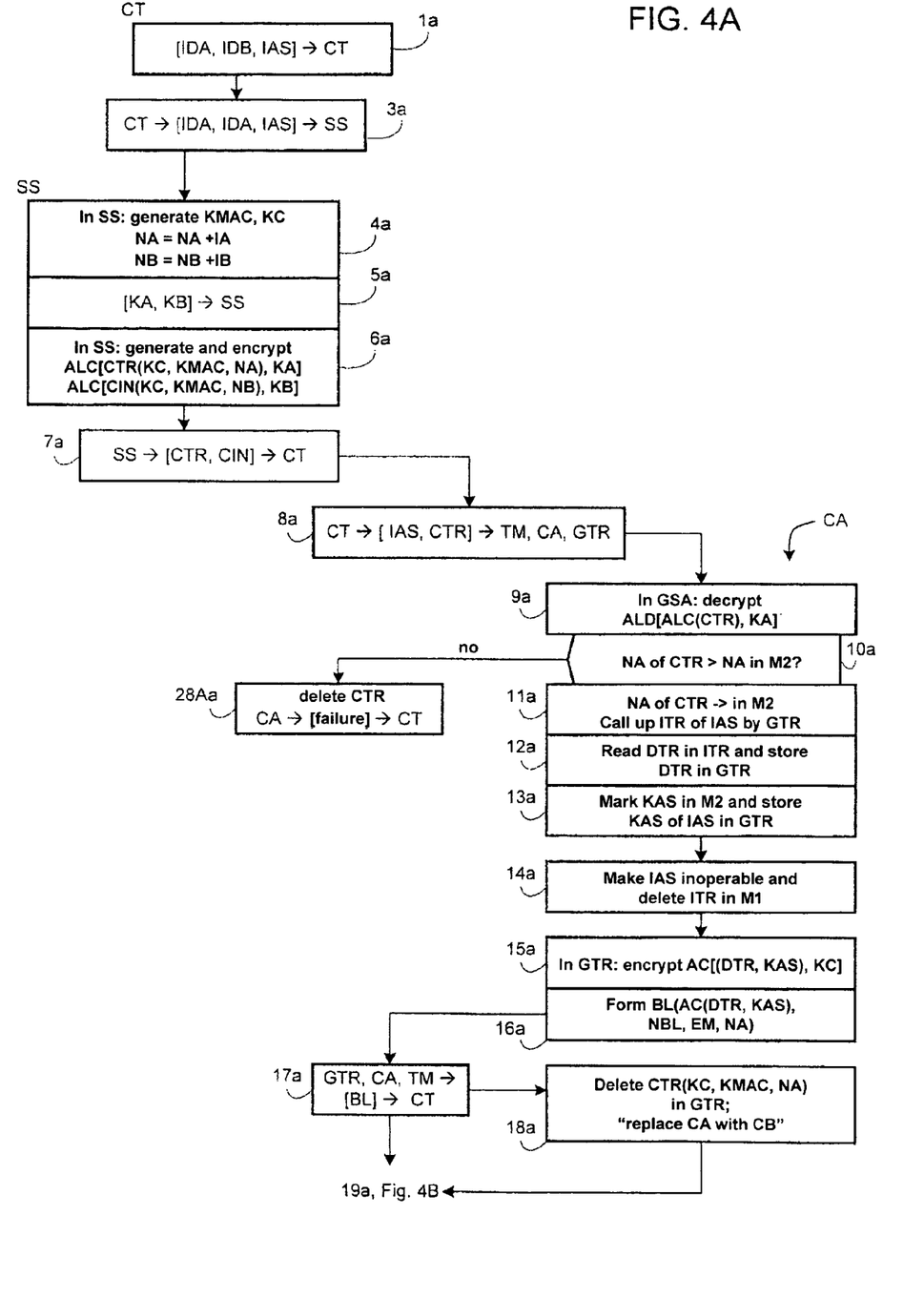
FIGS. 4A and 4B show steps of the data transfer method according to a second embodiment of the invention which calls for an incrementation of transfer counts.
Figure 4B:
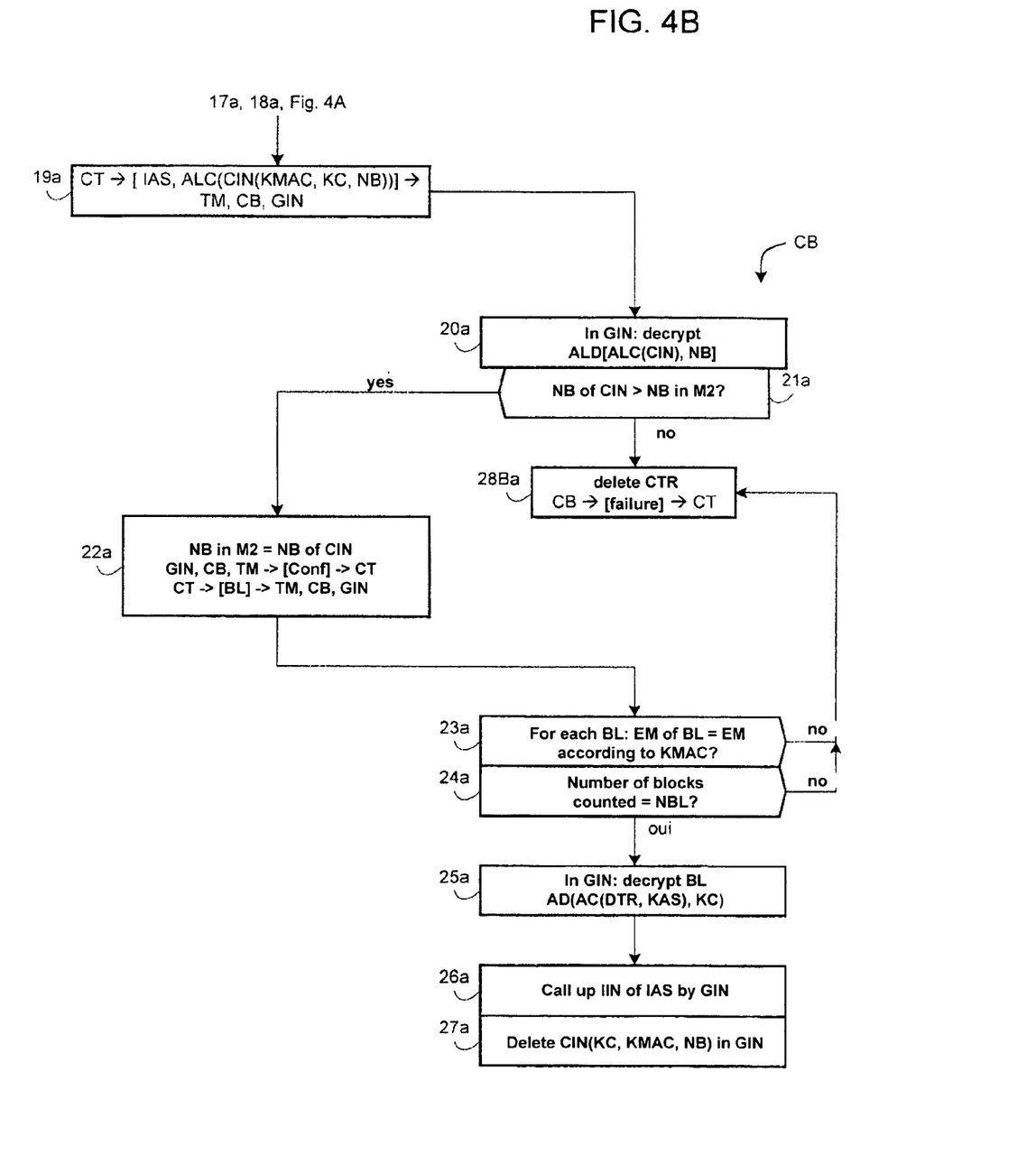

With reference to FIGS. 4A and 4B, the method for transferring data from the chip card CA to the chip card CB according to a second embodiment of the invention mainly comprises steps 1a to 27a, most of which are similar to those of the first embodiment. In the second embodiment, no random number RA, RB is retrieved by the transfer controller CT; consequently, the random generators GA are no longer necessary in the cards CA and CB and step 2 is removed.

Initially, in step 1a, the transfer controller CT retrieves the identities IDA and IDB of the two cards CA and CB and in particular the serial numbers of the cards, the user's international identity IMSI, the user's telephone number MSISDN, for example in the form of signed electronic certificates, and the identifier IAS of the specific application relating to replacement of the SIM card CA by the SIM card CB.

Then, in step 3a, the transfer controller CT starts the actual data transfer method by sending the card identities IDA and IDB and the identifier of the specific application IAS targeted by the method.

The secure server SS randomly generates, in step 4a, in response to the message transmitted by the controller CT in the previous step 3a, a transfer key KC and a hashing key KMAC which will be used in the card CA and then in the card CB. Also in step 4a, the secure server SS increments transfer counts NA and NB, respectively associated with the cards CA and CB, by respective increments IA and IB which may be simply equal to 1, or may be different, or else may be randomly generated. The transfer counts NA and NB will be incremented each time the secure server SS is made to designate a specific application and to call it up in the card CA and then in the card CB which replaces the card CA. For example, a specific application other than card replacement is the installation of an application such as an applet in the card, or the changing of an account value such as the loading of a monetary credit when the card has the function of an electronic wallet.

Then, in the next step 5a, like in step 5, the secure server SS retrieves transfer keys KA and KB specific to the cards CA and CB.

In step 6a, the secure server SS creates two electronic coupons CTR and CIN. The first coupon CTR is a data transfer coupon which includes the transfer key KC, the hashing key KMAC and the transfer count NA, and which is encrypted by an encryption algorithm ALC as a function of the key KA. The second coupon CIN is a data installation coupon which includes the hashing key KMAC, the transfer key KC and the transfer count NB, and which is encrypted according to the encryption algorithm ALC as a function of the key KB. As a variant, the algorithms for encrypting the coupons CTR and CIN are different.

The secure server SS transmits the two encrypted coupons CTR and CIN to the transfer controller CT, in step 7a.

Following reception of the two encrypted coupons CTR and CIN, the transfer controller CT calls up the card CA and particularly the transfer manager GTR in said card by means of the retrieved card identity IDA, in step 8a. During this call-up, the controller CT transmits the identifier IAS of the specific application and the encrypted transfer coupon CTR.

Using the key KA and a decryption algorithm ALD symmetrical to the encryption algorithm ALC used to encrypt the coupon CTR in step 6a, the transfer manager GTR in the card CA decrypts the coupon CTR, in step 9a.

The transfer manager GTR compares the transfer count NA retrieved in the decrypted coupon CTR with the internal transfer count NA read in the memory M2 of the card CA, in step 10a. If the retrieved transfer count is equal to or less than the internal transfer count, this means that the entity which transmitted the retrieved transfer count has not followed the transfer count update and is not the secure server SS. The manager GTR deletes the decrypted coupon CTR, that is to say the keys KC and KMAC and the transfer count NA, from the card CA, and the transfer method is stopped at an end step 28Aa. This stoppage consists in signalling the end of the method from the card CA to the transfer controller CT, and optionally in displaying or broadcasting a data transfer failure message in the mobile terminal TM in order to invite the user to change his card under the control of the operator at a point of sale.

If the retrieved transfer count is greater than the internal transfer count read in the card CA and therefore these counts differ from the increment IA, the transfer manager GTR in the card CA replaces the value of the internal transfer count by the value of the transfer count retrieved in the memory M2, and calls up the transfer interface ITR of the specific application designated by the identifier IAS received by the card CA, in step 11a. The transfer interface ITR returns the data DTR which are specific to said application and which are to be transferred, and the manager GTR stores them in step 12a. If some keys KAS associated with the specific application AS have been stored outside the application IAS, in the EEPROM memory M2, the manager GTR points to the keys KAS in this memory and records them temporarily in a buffer memory along with the read data DTR, in step 13a.

After having stored the data DTR and optionally the associated keys KAS, the transfer manager GTR makes the specific application IAS permanently inoperable by deleting it from the ROM memory M1, in step 14a. If necessary, the transfer manager GTR completely deletes the application ITR in the memory M1 and the data DTR and the possible associated keys KAS in the memory M2.

In step 15a, the transfer manager GTR encrypts the data DTR and the possible associated keys KAS which are read in the buffer memory of the manager, according to an encryption algorithm AC and as a function of the transfer key KC.

The data which have just been encrypted in step 15a are transmitted in successive blocks BL having a predetermined length to the transfer controller CT, in step 16a. Each block BL contains, besides the data to be transmitted and the encrypted associated keys KAS, the number NBL of blocks to be transmitted, the number of the block in the sequence of blocks to be transmitted, a condensed fingerprint EM which results from a one-way hashing applied to the encrypted data and the encrypted associated keys contained in the block and depending on the key KMAC retrieved in the received coupon CTR, the updated transfer count NA read in the memory M2 and the key KMAC. In steps 17a and 18a, like in steps 17 and 18, the transfer manager GTR of the card CA successively transmits the blocks BL to the transfer controller CT which temporarily stores them in step 17a, deletes the keys KC and KMAC and the updated transfer count NA in the memory M2 of the card CA, in step 18a, and invites the user to replace the card CA by the card CB in the mobile terminal TM, by displaying a text message or by broadcasting a voice message in the terminal. After steps 17a and 18a, if the card CB has not signalled its presence in the mobile terminal TM to the network RR and to the transfer controller CT, the transfer controller CT periodically transmits a message until the card CB discharges it from doing so once the card CB has been inserted and has become active in the mobile terminal TM, in step 19a. This message transmitted during the call-up of the card CB in step 19a contains the identifier IAS of the specific application AS, in the present case the replacement of a SIM card, and the encrypted installation coupon CIN which includes the keys KMAC and KC and the transfer count NB and which had been stored in step 6a.

The transfer method continues with steps 20a to 27a relating to the installation of the data DTR in the second card CB, as shown in FIG. 4B.

In step 20a, in the chip card CB, in response to the message transmitted by the controller CT via the network RR and the terminal TR, the installation manager GIN decrypts the coupon CIN using the algorithm ALD and as a function of the key KB which was stored beforehand in the memory M2 when the card CB was brought into service.

The manager GIN compares the transfer count NB retrieved in the decrypted coupon CIN with the transfer count NB read in the memory M2 of the card CB, in step 21a. If the retrieved transfer count is equal to or less than the internal transfer count, this means that the entity which transmitted the retrieved transfer count has not followed the count update and is not the secure server SS. In a step 28Ba, the manager GIN deletes the decrypted installation coupon CIN in the card CB, that is to say the keys KC and KMAC and the transfer count NB in the card CB, and the transfer method is stopped by signalling the transfer failure by the installation manager GIN in the card CB to the transfer controller CT.

If the retrieved transfer count is greater than the internal transfer count in the card CB and therefore these counts differ from the increment IB, the installation manager GIN in the card CB replaces the value of the read internal transfer count by the value of the retrieved transfer count NB, and creates a confirmation command which is relayed via the mobile terminal TM so as to transmit it to the transfer controller CT which, in response to this confirmation command, transmits the transferred data blocks BL to the card CB, in step 22a.

For each received block BL, the installation manager GIN determines a condensed fingerprint EM according to the hashing algorithm already used in the card CA and as a function of the key KMAC contained in the decrypted coupon CIN, and compares the fingerprint determined with the fingerprint EM extracted from the received block BL, in step 23a. In parallel with or prior to or after the determination of the fingerprint, the installation manager GIN verifies in step 24a that it has received all the blocks BL which had been transmitted by the card CA to the controller CT, by counting them and by comparing the block count with the total number NBL of blocks contained in each received block. If the compared fingerprints EM for one of the received blocks are different, or if the counted number of blocks is incorrect, the method stops by carrying out step 28Ba.

By contrast, if the fingerprints compared for each block are identical and the block count is correct, the installation manager GIN decrypts the encrypted specific application data DTR and possibly the encrypted keys KSA associated therewith according to a decryption algorithm AD which is symmetrical to the encryption algorithm AC, using the key KC included in the coupon CIN, in step 25a.

Then, in step 26a, once all the received blocks BL have been decrypted, the manager GIN calls up the installation interface IIN relating to the specific application IAS so as to transfer thereto the decrypted data DTR and possibly the external keys KAS associated with the application.

Finally, in step 27a, the installation manager GIN in the card CB deletes the keys KC and KMAC and the transfer count NB and therefore the coupon CIN in the card CB. The chip card CB in the mobile terminal TM can then be used in the conventional manner by the user.

According to encryption and decryption variants, the encryption algorithm ALC and the decryption algorithm ALD in steps 6, 6a and 9–20, 9a–20a may be asymmetrical with a private encryption key pre-stored in the chip card CA and a public encryption key retrieved by the secure server SS in step 5, 5a. Likewise, the encryption algorithm AC and the decryption algorithm AD in steps 15, 15a and 25, 25a may be asymmetrical with a private transfer key pre-stored or generated in the secure server SS in step 4, 4a and a public transfer key pre-stored or generated in the chip cards CA and CB or transmitted thereto in step 20, 20a. As a variant, the secure server SS is removed and the transfer controller CT performs the functions of the secure server.

Figure 5:
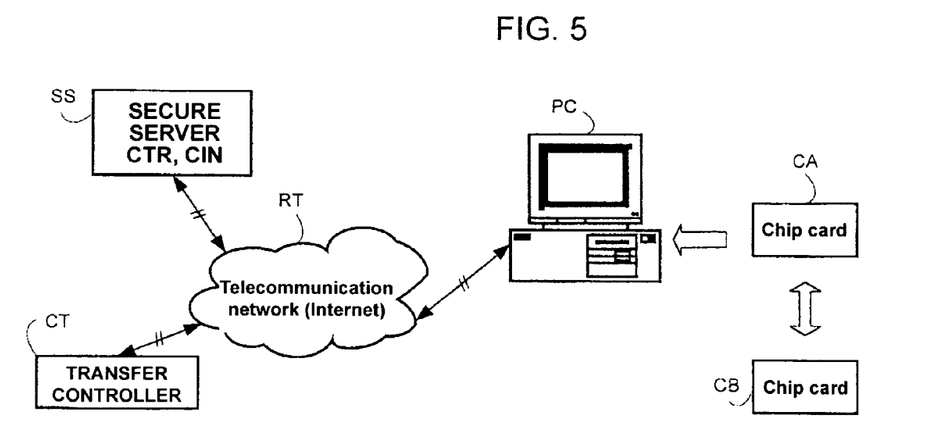
FIG. 5 is a schematic block diagram of another data transfer system for a chip card in a terminal of the personal computer type.

According to another embodiment shown in FIG. 5, two removable data processing means between which data DTR are to be transferred are chip cards CA and CB and the terminal means which receives the removable data processing means one after the other is a personal computer PC or a personal digital assistant (PDA) or any other electronic object, in particular a portable electronic object, which is connected to a telecommunication network RT and can read a chip card connected thereto. The network RT may include the Internet network and an access network such as the switched telephone network, or else constitute a local network, for example a WLAN (Wireless Local Area Network).

Like the terminal TM shown in FIG. 1, the terminal PC is transparent to communications between the transfer controller CT and the card CA, CB with regard to the transfer of data and commands relating thereto. The connection between the card CA, CB and the terminal PC is conventional and may be a connection via electrical contact, a connection known as a contactless connection, or a short-range radio connection of the Bluetooth or WiFi type.

In variants of this other embodiment, the terminal PC and the chip cards CA and CB are respectively a bank terminal and credit cards, or a point-of-sale terminal and electronic wallets.

According to one variant of the previous embodiments, the transfer of data according to the invention serves to update confidential data in one and the same card, with the result that the cards CA and CB are considered to be the same in the above description and the figures and the card replacement operation is removed in step 18, 18a. In this variant, the encrypted data transmitted in the form of blocks BL by the single card in step 17, 17a are decrypted by means of the algorithm AD in the transfer controller CT, which stores them temporarily, and then in step 22, 22a the processed data are encrypted by means of the algorithm AC and transmitted by the transfer controller CT to the single card.

The invention claimed is:

1. A method for transferring data from a first data processing means, which is connected to a terminal, to a second data processing means which is to be connected to the terminal comprising the following steps:
    transmitting a specific application identifier from an external means to the first processing means via the terminal,
    in the first processing means, calling up the specific application designated by the transmitted identifier, reading data relating to the specific application, encrypting the data so as to transmit encrypted data to the external means, and making inoperable the specific application before or after the encryption step,
    replacing the first processing means with the second processing means,
    transmitting the specific application identifier from the external means to the second processing means via the terminal means, and
    transmitting the encrypted data from the external means to the second processing means so that the latter calls up the specific application designated by the transmitted identifier, decrypts the encrypted data and installs the decrypted data.

2. The method according to claim 1, wherein
    an encrypted first key and number are transmitted with the specific application identifier from the external means to the first processing means via the terminal means,
    the first processing means decrypts the encrypted first key and number and, if the decrypted first number satisfies a first condition, calls up the specific application designated by the transmitted identifier and encrypts the read data relating to the specific application by using the first key,
    an encrypted second key and number are transmitted with the specific application identifier from the external means to the second processing means via the terminal means,
    the encrypted second key and number are decrypted in the second processing means and, if the decrypted second number satisfies a second condition, the external means transmits the encrypted data to the second processing means which decrypts the encrypted data by using the first key prior to installing them.

3. The method according to claim 2, comprising the steps of deleting the decrypted first key and number in the first processing means once the encrypted data have been transmitted to the external means, and/or deleting the decrypted second key and number in the second processing means once the encrypted data have been decrypted.

4. The method according to claim 2, further comprising the steps wherein, if the decrypted first number does not satisfy the first condition compared to a number read in the first processing means, deleting the encrypted first key and number in the first data processing means are deleted and/or a stoppage of the transfer process is signalled from the first data processing means to the external means, and, if the decrypted second number does not satisfy the second condition compared to a number read in the second processing means, the encrypted second key and number in the second data processing means are deleted and/or a stoppage of the transfer process is signalled from the second data processing means to the external means.

5. The method according to claim 2, wherein the first and second numbers are random numbers produced by the first and second processing means and retrieved in the external means prior to the transmission of the specific application identifier and of the encrypted first key and number to the first processing means, the first condition is an equality of the decrypted first number and of a number read in the first processing means, and the second condition is an equality of the decrypted second number and of a number read in the second processing means.

6. The method according to claim 2, wherein the first and second numbers are transfer counts incremented by respective increments in the external means each time said external means designates a specific application to call up in the first processing means and in the second processing means, the first condition is a superiority of the decrypted first number over a number read in the first processing means which, if it is satisfied, causes the number read in the first processing means to be replaced by the decrypted first number, and the second condition is a superiority of the decrypted second number over a number read in the second processing means which, if it is satisfied, causes the number read in the second processing means to be replaced by the decrypted second number.

7. The method according to claim 2, wherein the external means creates and encrypts beforehand a first electronic coupon including the first key, the first number and also a hashing key and a second electronic coupon including the second key and the second number and also the hashing key, and transmits the specific application identifier and the first coupon to the first processing means via the terminal, the first processing means decrypts the first coupon and transmits to the external means the encrypted data in the form of blocks of predetermined maximum length and a fingerprint which results from a hashing applied to the encrypted data and depends on the hashing key obtained from the decrypted first coupon, the external means transmits the specific application identifier and the second coupon to the second processing means via the terminal means, the second processing means decrypts the encrypted second coupon and, if the second number retrieved from the decrypted second coupon and a number read in the second processing means satisfy the second condition, the encrypted data in the form of blocks are transmitted from the external means to the second processing means so that the latter, for each received block, determines a fingerprint which it compares with the fingerprint extracted from the received block and decrypts the data in the blocks only if the fingerprints compared for each block are identical.

8. The method according to claim 2, wherein the external means comprises a secure means and a controller means which are connected to the terminal means via a telecommunication network, the controller transmits identities of the first and second processing means and the specific application identifier to the secure means, and the secure means generates the first and second keys and retrieves first and second encryption keys which are pre-stored in the first and second processing means and as employed to encrypt and decrypt at least the first key and number and at least the second key and number, respectively.

9. The method according to claim 1, further comprising the step of displaying a text message or broadcasting a voice message in the terminal to issue an invite to replace the first processing means with the second processing means.

10. The method according to claim 1, wherein the first and second data processing means are chip cards and the terminal receives the first and second data processing means one after the other and is a mobile radiocommunication terminal.

11. The method according to claim 1, wherein the first and second data processing means are one and the same.

* * * * *